United States Patent
Zhou et al.

(10) Patent No.: US 9,334,432 B2
(45) Date of Patent: May 10, 2016

(54) CURABLE COMPOSITIONS THAT INCLUDE HYDRAZIDE FUNCTIONAL MATERIALS

(71) Applicant: PPG Industries Ohio, Inc., Cleveland, OH (US)

(72) Inventors: Hongying Zhou, Allison Park, PA (US); Tien-Chieh Chao, Mars, PA (US); Shanti Swarup, Allison Park, PA (US); Xiangling Xu, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 42 days.

(21) Appl. No.: 14/084,975

(22) Filed: Nov. 20, 2013

(65) Prior Publication Data

US 2015/0141588 A1    May 21, 2015

(51) Int. Cl.
| | |
|---|---|
| C08G 59/14 | (2006.01) |
| C08G 59/16 | (2006.01) |
| C08L 63/00 | (2006.01) |
| C09J 163/00 | (2006.01) |
| C08G 59/40 | (2006.01) |
| C09D 163/00 | (2006.01) |

(52) U.S. Cl.
CPC ........... *C09J 163/00* (2013.01); *C08G 59/4035* (2013.01); *C09D 163/00* (2013.01)

(58) Field of Classification Search
CPC ...................................................... C08L 63/00
USPC ....................................................... 525/533
See application file for complete search history.

(56) References Cited

U.S. PATENT DOCUMENTS

| | | | |
|---|---|---|---|
| 3,154,511 A | 10/1964 | Logemann et al. | |
| 3,345,336 A | 10/1967 | Kuhlkamp et al. | |
| 3,978,156 A | 8/1976 | Parker et al. | |
| 4,171,413 A | 10/1979 | Hartman et al. | |
| 4,377,680 A | 3/1983 | Sponseller et al. | |
| 4,714,648 A | 12/1987 | Nagata | |
| 4,769,410 A | 9/1988 | Blum et al. | |
| 4,786,676 A | 11/1988 | Blum et al. | |
| 5,150,239 A * | 9/1992 | Watanabe et al. | 349/153 |
| 5,316,912 A | 5/1994 | Heimgartner et al. | |
| 5,635,259 A * | 6/1997 | Tahara et al. | 428/1.53 |
| 5,665,797 A | 9/1997 | Tahara et al. | |
| 5,756,766 A | 5/1998 | Kawauchi et al. | |
| 6,300,411 B1 | 10/2001 | Seko et al. | |
| 6,723,803 B1 | 4/2004 | Hermansen et al. | |
| 8,278,376 B2 | 10/2012 | Qiu et al. | |
| 8,440,746 B2 | 5/2013 | Swarup et al. | |

OTHER PUBLICATIONS

Pham et al.; "Epoxy Resins"; Encyclopedia of Polymer Science and Technology; Jan. 1, 2004; pp. 678-804; John Wiley & Sons, Inc.

* cited by examiner

*Primary Examiner* — David Karst
(74) *Attorney, Agent, or Firm* — Justin Martinchek

(57) ABSTRACT

The present invention relates to curable compositions that include a hydrazide functional material (a) represented by the following Formula (I),

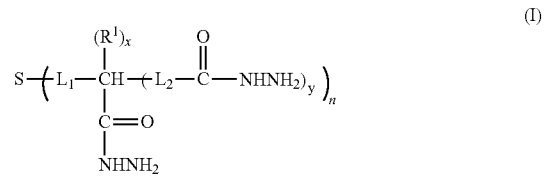

For Formula (I): n is 2; independently for each n, x is 0 or 1, y is 0 or 1, provided that the sum of x and y is 1; $L_1$, independently for each n, is selected from a divalent hydrocarbyl group optionally interrupted with at least one of —O— and —S—; $L_2$, independently for each n, is selected from a divalent hydrocarbyl group; and $R^1$, independently for each n, is selected from hydrogen and hydrocarbyl. The curable compositions further include a reactant (b) that has at least two reactive groups that are reactive with and form covalent bonds with the hydrazide groups of the hydrazide functional material (a). The present invention also relates to curable powder coating compositions and curable adhesive compositions.

21 Claims, No Drawings

US 9,334,432 B2

CURABLE COMPOSITIONS THAT INCLUDE HYDRAZIDE FUNCTIONAL MATERIALS

FIELD

The present invention relates to polyfunctional hydrazide materials and curable compositions that include one or more such polyfunctional hydrazide materials and a reactant that includes at least two reactive groups that are reactive with and form covalent bonds with the hydrazide groups of the polyfunctional hydrazide material.

BACKGROUND

Curable compositions, such as curable organic compositions, are used in numerous applications including, but not limited to, coatings, such as liquid coatings and powder coatings, adhesives, and molding compositions. Many curable compositions are thermally cured by exposure to elevated temperatures. With some curable compositions, high temperatures and extended times at such high temperatures are required to obtain an adequate level of cure. An adequate level of cure is typically determined with regard to one or more critical physical properties of the resulting cured article, such as hardness, abrasion resistance, solvent resistance, and/or tensile properties. High temperatures and/or extended cure times can contribute to undesirably increased economic costs associated with some thermally curable compositions.

It would be desirable to develop new curable compositions, such as thermally curable compositions, that are capable of being cured at lower temperatures and/or reduced cure times, compared to existing curable compositions, without a reduction in required physical properties. It would also be desirable to develop new materials that can be used in such newly developed curable compositions.

SUMMARY

In accordance with the present invention, there is provided a hydrazide functional material represented by the following Formula (I),

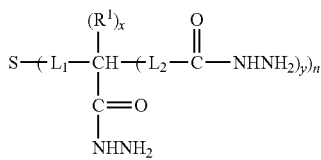

(I)

With reference to Formula (I): n is 2; independently for each n, x is 0 or 1, y is 0 or 1, provided that the sum of x and y is 1; $L_1$, independently for each n, is selected from a divalent hydrocarbyl group optionally interrupted with at least one of —O— and/or —S—; $L_2$, independently for each n, is selected from a divalent hydrocarbyl group; and $R^1$, independently for each n, is selected from hydrogen and hydrocarbyl.

In accordance with the present invention, there is further provided a curable composition that comprises: (a) one or more hydrazide functional materials represented by Formula (I) above; and (b) a reactant comprising at least two reactive groups that are reactive with and form covalent bonds with the hydrazide groups of the hydrazide functional material.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

DETAILED DESCRIPTION

As used herein, the articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, unless otherwise indicated, left-to-right representations of linking groups, such as divalent linking groups, are inclusive of other appropriate orientations, such as, but not limited to, right-to-left orientations. For purposes of non-limiting illustration, the left-to-right representation of the divalent linking group

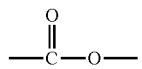

or equivalently —C(O)O—, is inclusive of the right-to-left representation thereof,

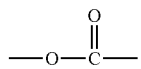

or equivalently —O(O)C— or —OC(O)—.

Other than in the operating examples, or where otherwise indicated, all numbers expressing quantities of ingredients, reaction conditions, and so forth used in the specification and claims are to be understood as modified in all instances by the term "about."

As used herein, molecular weight values of polymers, such as weight average molecular weights (Mw), number average molecular weights (Mn), and z-average molecular weight (Mz) are determined by gel permeation chromatography using appropriate standards, such as, but not limited to, polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means methacrylates and/or acrylates. As used herein, the term "(meth)acrylic acid" means methacrylic acid and/or acrylic acid.

As used herein, spatial or directional terms, such as "left", "right", "inner", "outer", "above", "below", and the like, relate to the invention as it is depicted in the drawing figures.

It is to be understood, however, that the invention can assume various alternative orientations and, accordingly, such terms are not to be considered as limiting.

All documents, such as but not limited to issued patents and patent applications, referred to herein, and unless otherwise indicated, are to be considered to be "incorporated by reference" in their entirety.

As used herein, the term "free flowing" with regard to curable solid particulate compositions of the present invention, means a curable solid particulate composition having the handling characteristics of a substantially dry particulate composition, having a minimum of clumping or aggregation between individual particles.

As used herein, the term "hydroxyl" and related terms, such as "hydroxyl," mean —OH groups.

As used herein, the term "hydrazide" and related terms, such as "hydrazide group" means the following moiety:

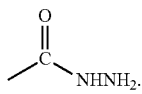

As used herein, the term "oxirane" and related terms, such as "oxirane group" and "epoxy group" means the following moiety:

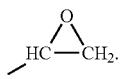

As used herein, the term "thiooxirane" and related terms, such as "thiooxirane group" means the following moiety:

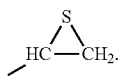

As used herein, the term "isocyanate" and related terms, such as "isocyanate group" means the following moiety: —N═C═O.

As used herein, the term "isothiocyanate" and related terms, such as "isothiocyanate group" means the following moiety: —N═C═S.

As used herein, recitations of "linear or branched" groups, such as linear or branched alkyl, are herein understood to include: a methylene group or a methyl group; groups that are linear, such as linear $C_2$-$C_{25}$ alkyl groups; and groups that are appropriately branched, such as branched $C_3$-$C_{25}$ alkyl groups.

The hydrazide functional materials of the present invention include: divalent linking groups (such as $L_1$ and $L_2$ of Formula (I), and $L_3$ of Formula (I-B)), that are in each case, with some embodiments, independently selected from divalent hydrocarbyl; and optionally substituted hydrocarbyl groups. As used herein the term "hydrocarbyl" and similar terms, such as "hydrocarbyl substituent" and "hydrocarbyl group" means: linear or branched $C_1$-$C_{25}$ alkyl (e.g., linear or branched $C_1$-$C_{10}$ alkyl, or linear or branched $C_1$-$C_6$ alkyl); linear or branched $C_2$-$C_{25}$ alkenyl (e.g., linear or branched $C_2$-$C_{10}$ alkenyl); linear or branched $C_2$-$C_{25}$ alkynyl (e.g., linear or branched $C_2$-$C_{10}$ alkynyl); $C_3$-$C_{12}$ cycloalkyl (e.g., $C_3$-$C_{10}$ cycloalkyl, or $C_3$-$C_6$ cycloalkyl); $C_3$-$C_{12}$ heterocycloalkyl (having at least one hetero atom in the cyclic ring); $C_5$-$C_{18}$ aryl (including polycyclic aryl groups) (e.g., $C_5$-$C_{18}$ aryl); $C_5$-$C_{18}$ heteroaryl (having at least one hetero atom in the aromatic ring); and $C_6$-$C_{24}$ aralkyl (e.g., $C_6$-$C_{10}$ aralkyl).

Representative alkyl groups include but are not limited to methyl, ethyl, propyl, isopropyl, butyl, isobutyl, sec-butyl, tert-butyl, pentyl, neopentyl, hexyl, heptyl, octyl, nonyl and decyl. Representative alkenyl groups include but are not limited to vinyl, allyl and propenyl. Representative alkynyl groups include but are not limited to ethynyl, propynyl, 1-butynyl, and 2-butynyl. Representative cycloalkyl groups include but are not limited to cyclopropyl, cyclobutyl, cyclopentyl, cyclohexyl, and cyclooctyl groups. Representative heterocycloalkyl groups include but are not limited to imidazolyl, tetrahydrofuranyl, tetrahydropyranyl, morpholinyl, and piperidinyl. Representative aryl groups include but are not limited to phenyl, naphthyl, anthracenyl and triptycenyl. Representative heteroaryl groups include but are not limited to furanyl, pyranyl, pyridinyl, isoquinoline, and pyrimidinyl. Representative aralkyl groups include but are not limited to benzyl, and phenethyl.

The term "alkyl" as used herein, in accordance with some embodiments, means linear or branched alkyl, such as but not limited to, linear or branched $C_1$-$C_{25}$ alkyl, or linear or branched $C_1$-$C_{10}$ alkyl, or linear or branched $C_2$-$C_{10}$ alkyl, or linear or branched $C_1$-$C_6$ alkyl. Examples of alkyl groups from which the various alkyl groups of the present invention can be selected from, include, but are not limited to, those recited previously herein. Alkyl groups of the various compounds of the present invention can, with some embodiments, include one or more unsaturated linkages selected from —CH═CH— groups and/or one or more —C≡C— groups, provided that the alkyl group is not aromatic. With some embodiments, the alkyl group is free of two or more conjugated unsaturated linkages. With some embodiments, the alkyl groups are free of unsaturated linkages, such as —CH═CH— groups and —C≡C— groups.

The term "cycloalkyl" as used herein, in accordance with some embodiments, means groups that are appropriately cyclic, such as but not limited to, $C_3$-$C_{12}$ cycloalkyl (including, but not limited to, cyclic $C_5$-$C_7$ alkyl) groups. Examples of cycloalkyl groups include, but are not limited to, those recited previously herein. The term "cycloalkyl" as used herein in accordance with some embodiments also includes: bridged ring polycycloalkyl groups (or bridged ring polycyclic alkyl groups), such as but not limited to, bicyclo[2.2.1]heptyl (or norbornyl) and bicyclo[2.2.2]octyl; and fused ring polycycloalkyl groups (or fused ring polycyclic alkyl groups), such as, but not limited to, octahydro-1H-indenyl, and decahydronaphthalenyl.

The term "heterocycloalkyl" as used herein, in accordance with some embodiments, means groups that are appropriately cyclic, such as but not limited to, $C_3$-$C_{12}$ heterocycloalkyl groups or $C_5$-$C_7$ heterocycloalkyl groups, and which have at least one hetero atom in the cyclic ring, such as, but not limited to, O, S, N, P, and combinations thereof. Examples of heterocycloalkyl groups include, but are not limited to, those recited previously herein. The term "heterocycloalkyl" as used herein, in accordance with some embodiments, also includes: bridged ring polycyclic heterocycloalkyl groups, such as but not limited to, 7-oxabicyclo[2.2.1]heptanyl; and fused ring polycyclic heterocycloalkyl groups, such as but not limited to, octahydrocyclopenta[b]pyranyl, and octahydro-1H-isochromenyl.

The term "heteroaryl," as used herein, in accordance with some embodiments, includes but is not limited to $C_5$-$C_{18}$ heteroaryl, such as but not limited to $C_6$-$C_{10}$ heteroaryl (including fused ring polycyclic heteroaryl groups) and means an aryl group having at least one hetero atom in the aromatic ring, or in at least one aromatic ring in the case of a fused ring polycyclic heteroaryl group. Examples of heteroaryl groups Include, but are not limited to, those recited previously herein.

The term "aralkyl," as used herein, and in accordance with some embodiments, includes but is not limited to $C_6$-$C_{24}$ aralkyl, such as but not limited to $C_6$-$C_{10}$ aralkyl, and means an aryl group substituted with an alkyl group. Examples of aralkyl groups include, but are not limited to, those recited previously herein.

As used herein, the term "optionally interrupted with at least one of —O— and —S—" with regard to the various divalent linking groups of the hydrazide functional materials of the present invention means that at least one carbon of, but less than all of the carbons of, the divalent linking group (such as, but not limited to, a divalent hydrocarbyl group) is in each case independently replaced with one of the recited divalent non-carbon linking groups. The divalent linking groups can be interrupted with two or more of the above recited non-carbon linking groups, which can be adjacent to each other or separated by one or more carbons. Examples of adjacent non-carbon divalent linking groups include, but are not limited to: divalent peroxide groups, —O—O—; and divalent polysulfide linkages, —(S)$_z$—, where z is at least 2, such as from 2 to 6. With some embodiments, the divalent linking groups which are interrupted with at least one of —O— and/or —S— are free of two or more adjacent divalent oxygen groups —O—, and are free of two or more adjacent divalent sulfur groups —S—.

The hydrazide functional materials of the present invention include those as described previously herein with reference to Formula (I). With some embodiments of the present invention, and with further reference to Formula (I): $L_1$, independently for each n, is a divalent group selected from divalent aryl, divalent $C_3$-$C_8$ cycloalkyl, and divalent linear or branched $C_1$-$C_{20}$ alkyl, in which each divalent group is optionally interrupted with at least one of —O— and —S—; $L_2$, independently for each n, is selected from divalent aryl, divalent $C_3$-$C_8$ cycloalkyl, and divalent linear or branched $C_1$-$C_{20}$ alkyl; and $R^1$, independently for each n, is selected from hydrogen, aryl, $C_3$-$C_8$ cycloalkyl, and linear or branched $C_1$-$C_{20}$ alkyl.

In accordance with some further embodiments, with the hydrazide functional materials of the present invention represented by Formula (I): $L_1$, independently for each n, is selected from divalent linear or branched $C_1$-$C_6$ alkyl; $L_2$, independently for each n, is selected from divalent linear or branched $C_1$-$C_6$ alkyl; and $R^1$, independently for each n, is selected from hydrogen and linear or branched $C_1$-$C_6$ alkyl. Examples of linear or branched $C_1$-$C_6$ alkyl groups from which the divalent linear or branched $C_1$-$C_6$ alkyl groups of $L_1$ and $L_2$ can each be Independently selected include, but are not limited to, those examples as recited previously herein, such as, but not limited to, methyl, ethyl, propyl, butyl, pentyl, hexyl, and structural isomers thereof. For purposes of non-limiting illustration, structural isomers of butyl include but are not limited to, n-butyl, sec-butyl, iso-butyl, and tert-butyl.

The hydrazide functional materials of the present invention, such as represented by Formula (I), with some embodiments, are selected from at least one hydrazide functional material represented by the following Formula (I-A) and/or Formula (I-B),

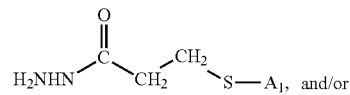
(I-A)

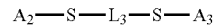
(I-B)

With reference to Formula (I-B), $L_3$ is selected from divalent hydrocarbyl optionally interrupted with at least one of —S— and —O—.

With reference to Formula (I-A) and Formula (I-B), $A_1$, $A_2$, and $A_3$ are in each case independently selected from a group represented by the following Formula (IV) and Formula (V),

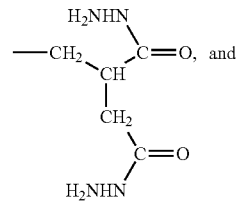
(IV)

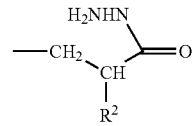
(V)

With reference to Formula (V), $R^2$ in each case is independently selected from hydrogen and methyl.

In accordance with some embodiments, and with further reference to Formula (I-B), $L_3$ is selected from divalent linear or branched $C_1$-$C_6$ alkyl optionally interrupted with at least one of —S— and —O—. Examples of linear or branched $C_1$-$C_6$ alkyl groups from which the divalent linear or branched $C_1$-$C_6$ alkyl groups of $L_3$ can be selected include, but are not limited to, those examples as recited previously herein, such as, but not limited to, methyl, ethyl, propyl, butyl, pentyl, hexyl, and structural isomers thereof.

With further reference to Formula (I-B), and in accordance with some embodiments, $L_3$ is selected from —$CH_2$—, —$CH_2CH_2$—, —$CH_2CH_2$—S—$CH_2CH_2$—, and —$CH_2CH_2$—O—$CH_2CH_2$—.

The hydrazide functional materials of the present invention can be prepared in accordance with appropriate synthetic methods, with some embodiments. With some embodiments, the hydrazide functional materials of the present invention are prepared by a two-step method. In the first step, (A) a first organic compound that includes (i) at least one carboxyllic acid ester group, and (II) an ethylenically unsaturated group, and (B) a second organic compound that includes at least one thiol group (—SH), are reacted together. With some embodiments, the second organic compound (B) further includes at least one carboxylic acid ester group. The first step, with some embodiments, results in the formation of an intermediate compound that includes at least two carboxylic acid ester groups and at least one thio or sulfide linkage (—S—). While not intending to be bound by any theory it is believed that the thiol group of the second organic compound and the ethylenically unsaturated group of the first organic compound react together by a thiol-ene reaction or mechanism so as to form a thio or sulfide linkage (—S—) between the first organic compound (A) and the second organic compound (B). In a second step, the intermediate compound of the first reaction and hydrazine (H₂N—NH₂) are reacted together so as to convert at least two of the carboxylic acid ester groups of the intermediate compound to hydrazide groups. More detailed, and non-limiting, descriptions of methods of forming hydrazide functional materials according to the present invention are provided in the Examples further herein.

With some embodiments, the first organic compound (A), from which the intermediate compound is prepared, is selected from dialkyl itaconate, alkyl(meth)acrylate, and combinations thereof, in which the alkyl groups are each independently selected from linear or branched $C_1$-$C_{20}$ alkyl, or linear or branched $C_1$-$C_{10}$ alkyl, or linear or branched $C_1$-$C_6$ alkyl, including but not limited to those examples of linear or branched alkyl groups as recited previously herein. With some further embodiments, the first organic compound (A), from which the intermediate compound is prepared, is selected from dimethyl itaconate, methyl(meth)acrylate, and combinations thereof.

The second organic compound (B) from which the intermediate compound is prepared, with some embodiments, is selected from one or more organic compounds represented by the following Formula (VI) and/or Formula (VII):

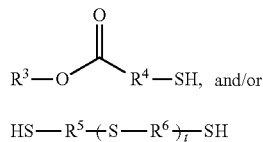

With reference to Formula (VI), $R^3$, with some embodiments is selected from hydrocarbyl, such as, but not limited to, linear or branched $C_1$-$C_{20}$ alkyl, or linear or branched $C_1$-$C_{10}$ alkyl, or linear or branched $C_1$-$C_6$ alkyl, including but not limited to those examples of linear or branched alkyl groups as recited previously herein. With further reference to Formula (VI), $R^4$ is selected from divalent hydrocarbyl, such as, but not limited to divalent linear or branched $C_1$-$C_{20}$ alkyl, or divalent linear or branched $C_1$-$C_{10}$ alkyl, or divalent linear or branched $C_1$-$C_6$ alkyl. Examples of hydrocarbyl groups and linear or branched alkyl groups from which the divalent hydrocarbyl groups and divalent linear or branched alkyl groups from which $R^4$ of Formula (VI) can be selected include, but are not limited to, those examples as recited previously herein. With some embodiments, $R^3$ of Formula (VI) is selected from methyl and ethyl, and $R^4$ is selected from divalent methyl and divalent ethyl.

With reference to Formula (VII), $R^5$, and $R^6$ independently for each t, are each independently selected from divalent hydrocarbyl, such as, but not limited to, divalent linear or branched $C_1$-$C_{20}$ alkyl, or divalent linear or branched $C_1$-$C_{10}$ alkyl, or divalent linear or branched $C_1$-$C_6$ alkyl. Examples of hydrocarbyl groups and linear or branched alkyl groups from which the divalent hydrocarbyl groups and divalent linear or branched alkyl groups from which $R^5$ and $R^6$ of Formula (VII) can each be independently selected include, but are not limited to, those examples as recited previously herein. With some embodiments, $R^5$ and $R^6$ of Formula (VII) are each independently selected from divalent ethyl, divalent n-propyl, and divalent iso-propyl. With further reference to Formula (VII), subscript t is 0 or greater, such as from 0 to 100, or from 0 to 50, or from 0 to 25, or from 0 to 15, or from 0 to 10, or from 0 to 5.

The hydrazide functional material of the present invention, with some embodiments, includes one or more hydrazide functional materials represented by the following Formulas (I-1) through (I-8):

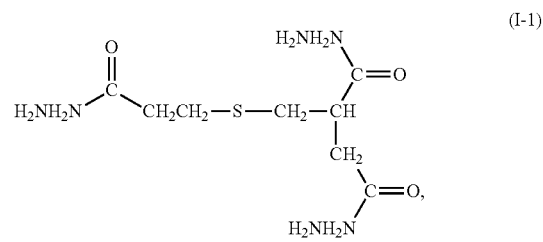

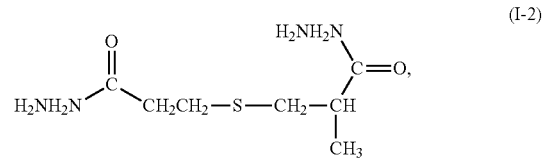

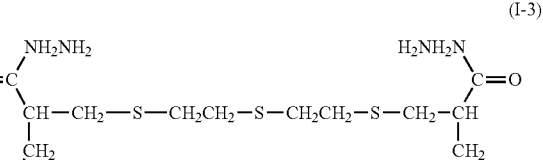

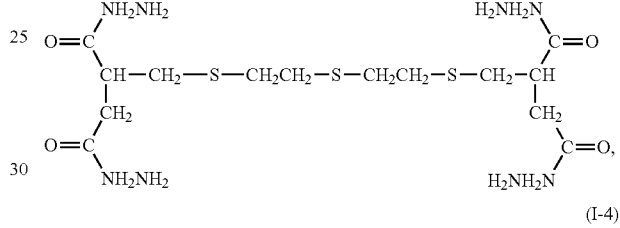

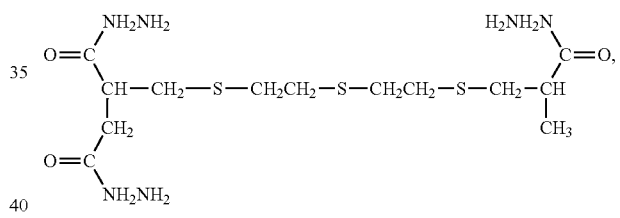

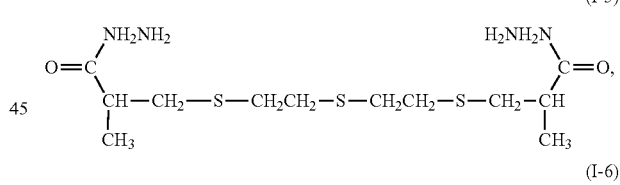

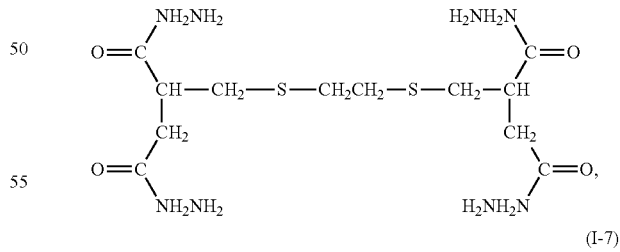

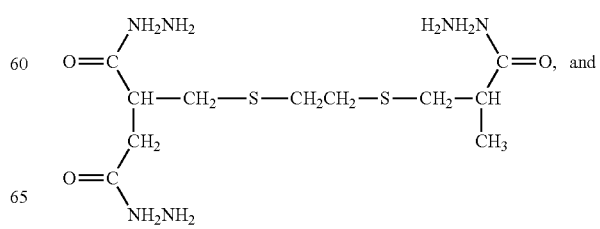

-continued

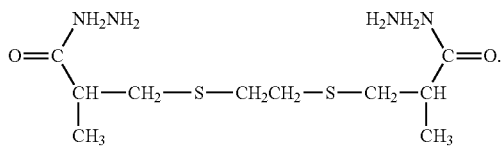

(I-8)

In accordance with the present Invention there is also provided a curable composition that includes: (a) one or more hydrazide functional materials represented by Formula (I) and related materials as described previously herein; and (b) a reactant that includes at least two reactive groups that are reactive with and form covalent bonds with the hydrazide groups of the hydrazide functional material.

The reactant (b) of the curable composition of the present invention, with some embodiments is selected from polymers, oligomers, and/or single molecule materials (that are neither polymeric nor oligomeric), which each independently have at least two reactive groups that are reactive with and form covalent bonds with the hydrazide groups of the hydrazide functional material.

Each reactive group of the reactant (b), of the curable compositions of the present invention, with some embodiments, is independently selected from oxirane, thiooxirane, isocyanate, isothiocyanate, capped isocyanate, capped isothiocyanate, keto groups (or ketone groups), and aldehyde (or aldehyde groups).

In accordance with some embodiments, reactant (b) of the curable compositions of the present invention, is a polymer selected from (meth)acrylate polymers, polyethers, polyesters, polyurethanes, and combinations thereof. Each such polymer independently has at least two reactive groups that are reactive with and form covalent bonds with the hydrazide groups of said hydrazide functional material. With some embodiments, each reactive group, of each such polymer, is independently selected from oxirane, thiooxirane, isocyanate, isothiocyanate, capped isocyanate, capped isothiocyanate, keto groups, and aldehyde.

The polymers from which reactant (b), of the curable compositions of the present invention, can each be prepared in accordance with art-recognized methods, with some embodiments. The (meth)acrylate polymers, from which reactant (b) can be selected, are prepared by art-recognized methods, such as free radical polymerization and/or living radical polymerization, such as atom transfer radical polymerization and/or electron transfer radical polymerization. The (meth)acrylate polymers include residues or monomer units of (meth)acrylate monomers, and optionally vinyl aromatic monomers, optionally vinyl esters of carboxylic acids, optionally allylic monomers, optionally olefins, and optionally other ethylenically unsaturated radically polymerizable monomers.

With some embodiments, the (meth)acrylate monomers, from which the (meth)acrylate polymer is prepared, are selected from at least one of alkyl(meth)acrylates having from 1 to 20 carbon atoms in the alkyl group. Examples of alkyl(meth)acrylates having from 1 to 20 carbon atoms in the alkyl group that can be used include, but are not limited to, methyl(meth)acrylate, ethyl(meth)acrylate, propyl(meth) acrylate, isopropyl(meth)acrylate, butyl(meth)acrylate, isobutyl(meth)acrylate, tert-butyl(meth)acrylate, 2-ethylhexyl(meth)acrylate, lauryl(meth)acrylate, isobornyl(meth) acrylate, cyclohexyl(meth)acrylate and 3,3,5-trimethylcyclohexyl(meth)acrylate.

With some embodiments, the (meth)acrylate polymers include residues or monomer units of oxirane functional ethylenically unsaturated radically polymerizable monomers. Examples of oxirane functional ethylenically unsaturated radically polymerizable monomers that can be used, with some embodiments, in the preparation of the (meth)acrylate polymers include, but are not limited to, glycidyl(meth)acrylate, 3,4-epoxycyclohexylmethyl(meth)acrylate, 2-(3,4-epoxycyclohexyl)ethyl(meth)acrylate and allyl glycidyl ether.

With some embodiments, the (meth)acrylate polymers include residues or monomer units of ketone functional ethylenically unsaturated radically polymerizable monomers and/or aldehyde functional ethylenically unsaturated radically polymerizable monomers. Examples of ketone/aldehyde functional ethylenically unsaturated radically polymerizable monomers that can be used to prepare (meth)acrylate polymers from which reactant (b) can with some embodiments be selected, include, but are not limited to, (meth) acrolein, diacetone(meth)acrylamide, formylstyrol, vinylmethylketone, vinylethylketone, diacetone(meth)acrylate, and acetoacetoxyethyl(meth)acrylate.

Examples of vinyl aromatic monomers that can be used to prepare the (meth)acrylate polymers include, but are not limited to, styrene, p-chloromethylstyrene, divinyl benzene, vinyl naphthalene and divinyl naphthalene. Examples of vinyl halides include, but are not limited to, vinyl chloride and vinylidene fluoride.

Examples of vinyl esters of carboxylic acids that can be used to prepare the (meth)acrylate polymers include, but are not limited to, vinyl acetate, vinyl butyrate, vinyl 3,4-dimethoxybenzoate and vinyl benzoate.

As used herein, by "olefin" and like terms is meant unsaturated aliphatic hydrocarbons having one or more double bonds, such as obtained by cracking petroleum fractions. Examples of olefins that can be used to prepare the (meth) acrylate polymers include, but are not limited to, propylene, 1-butene, 1,3-butadiene, isobutylene and diisobutylene.

As used herein, by "allylic monomer(s)" is meant monomers containing substituted and/or unsubstituted allylic functionality, such as one or more radicals represented by the following Formula (VIII), $$H_2C=C(R_a)-CH_2-\qquad\qquad(VII)$$

With reference to Formula (VIII), $R_a$ is hydrogen, halogen or a $C_1$ to $C_4$ alkyl group. With some embodiments, $R_a$ is hydrogen or methyl and consequently Formula (I) represents an unsubstituted (meth)allyl radical. Examples of allylic monomers that can be used to prepare the (meth)acrylate polymers include, but are not limited to: (meth)allyl alcohol; (meth)allyl ethers, such as methyl(meth)allyl ether; allyl esters of carboxylic acids, such as (meth)allyl acetate, (meth) allyl butyrate, (meth)allyl 3,4-dimethoxybenzoate and (meth) allyl benzoate.

Other ethylenically unsaturated radically polymerizable monomers that can be used to prepare the (meth)acrylate polymers include, but are not limited to: cyclic anhydrides, such as maleic anhydride, 1-cyclopentene-1,2-dicarboxylic anhydride and itaconic anhydride; esters of acids that are unsaturated but do not have alpha/beta-ethylenic unsaturation, such as methyl ester of undecylenic acid; and diesters of ethylenically unsaturated dibasic acids, such as diethyl maleate.

The (meth)acrylate polymers, from which reactant (b) of the curable compositions of the present invention can be selected, can have, with some embodiments, a reactive group equivalent weight of at least 100 grams/equivalent, or at least 200 grams/equivalent. The reactive group equivalent weight of the (meth)acrylate polymers is, with some embodiments, less than 10,000 grams/equivalent, or less than 5,000 grams/equivalent, or less than 1,000 grams/equivalent. The reactive group equivalent weight of the (meth)acrylate polymers can, with some embodiments, range between any combination of these values, inclusive of the recited values, such as from 100 to 10,000 grams/equivalent, or from 200 to 5,000 grams/equivalent, or from 200 to 1,000 grams/equivalent, inclusive of the recited values.

The number average molecular weight (Mn) of the (meth)acrylate polymers, from which reactant (b) of the curable compositions of the present invention can be selected, is with some embodiments at least 250, or at least 500, or at least 1,000, or at least 2,000. The (meth)acrylate polymers also have, with some embodiments, an Mn of less than 16,000, or less than 10,000, or less than 5,000. The Mn of the (meth)acrylate polymers can, with some embodiments, range between any combination of these values, inclusive of the recited values, such as from 250 to 16,000, or from 500 to 10,000, or from 1,000 to 5,000, or from 2,000 to 5,000, Inclusive of the recited values.

The polyethers, from which reactant (b) of the compositions of the present invention can be selected, are prepared in accordance with art-recognized methods, with some embodiments. With some embodiments the polyethers can be prepared from polyols having two or more hydroxy groups and polyepoxides having two or more epoxide groups, which are reacted in proportions such that the resulting polyether has hydroxy functionality or oxirane functionality. The polyols and polyepoxides used in the preparation of the polyethers may be selected from, for example, aliphatic, cycloaliphatic and aromatic polyols and polyepoxides, and mixtures thereof. Specific examples of polyols include, but are not limited to, glycerin, trimethylolpropane, trimethylolethane, trishydroxyethylisocyanurate, pentaerythritol, ethylene glycol, propylene glycol, trimethylene glycol, 1,3-, 1,2- and 1,4-butanediols, heptanediol, hexanediol, octanediol, 2,2-bis(4-cyclohexanol)propane, neopentyl glycol, 2,2,3-trimethylpentane-1,3-diol, 1,4-dimethylolcyclohexane, 2,2,4-trimethylpentane diol, and like polyols. Additional examples of polyols include, but are not limited to, those classes and examples recited further therein with regard to the polyol of the polyol residue having at least two oxirane groups, from which reactant (b) can be selected with some embodiments.

Polyepoxides useful in preparing polyethers include, with some embodiments, those resulting from the reaction of a polyol and epichlorohydrin. With some embodiments, one or more of the polyols recited previously and further herein can be reacted with epichlorohydrin, so as to result in the formation of a polyepoxide. For purposes of non-limiting illustration, the polyether can be prepared, with some embodiments, from: 4,4'-(propane-2,2-diyl)diphenol and the diglycidyl ether of 4,4'-(propane-2,2-diyl)diphenol; or 4,4'-(propane-2,2-diyl)dicylcohexanol and the diglycidyl ether of 4,4'-(propane-2,2-diyl)dicylcohexanol.

The polyethers, from which reactant (b) of the compositions of the present invention can be selected, with some embodiments, have a Mn of less than 10,000, such as from 1,000 and 7,000. The reactive group equivalent weight of the polyethers is, with some embodiments, less than or equal to 3,000 grams/equivalent, such as from 300 and 2,000 grams/equivalent.

Polyesters, from which reactant (b) of the compositions of the present invention can be selected, can be prepared by art-recognized methods, which include reacting carboxylic acids (or their anhydrides) having acid functionalities of at least 2, and polyols having hydroxy functionalities of at least 2. The molar equivalents ratio of carboxylic acid groups to hydroxy groups of the reactants is selected such that the resulting polyester has hydroxyl functionality and/or carboxylic acid functionality, and a desired molecular weight.

Examples of multifunctional carboxylic acids useful in preparing polyesters, from which reactant (b) of the compositions of the present invention can be selected, include, but are not limited to, benzene-1,2,4-tricarboxylic acid, phthalic acid, tetrahydrophthalic acid, hexahydrophthalic acid, endobicyclo-2,2,1,5-heptyne-2,3-dicarboxylic acid, tetrachlorophthalic acid, cyclohexanedoic acid, succinic acid, isophthalic acid, terephthalic acid, azelaic acid, maleic acid, trimesic acid, 3,6-dichlorophthalic acid, adipic acid, sebacic acid, and like multifunctional carboxylic acids.

Examples of polyols useful in preparing polyesters, from which reactant (b) of the compositions of the present invention can be selected, include, but are not limited to, the polyols recited previously herein, and further herein with regard to the polyols from which the polyol residues having at least two oxirane groups can be prepared. With some embodiments, polyols (from which polyesters can be prepared) include, but are not limited to, glycerin, trimethylolpropane, trimethylolethane, trishydroxyethylisocyanurate, pentaerythritol, ethylene glycol, propylene glycol, trimethylene glycol, 1,3-, 1,2- and 1,4-butanediols, heptanediol, hexanediol, octanediol, 2,2-bis(4-cyclohexanol)propane, neopentyl glycol, 2,2,3-trimethylpentane-1,3-diol, 1,4-dimethylolcyclohexane, 2,2,4-trimethylpentane diol, and like polyols.

Polyesters, from which reactant (b) of the compositions of the present invention can be selected, have an Mn of less than or equal to 10,000, such as from 1,000 to 10,000, or from 2,000 to 7,000, with some embodiments. The reactive group equivalent weight of the polyesters is, with some embodiments, less than or equal to 3000 grams/equivalent, such as from 300 to 2,000 grams/equivalent.

Polyurethanes, from which reactant (b) of the compositions of the present invention can be selected, can be prepared by art-recognized methods from a polyisocyanate having at least two isocyanate groups and a polyol having at least two hydroxyl groups. The molar equivalents ratio of Isocyanate groups to hydroxy groups of the reactants is selected such that the resulting polyurethane has hydroxyl functionality and/or isocyanate functionality, and a desired molecular weight.

Examples of polyisocyanates useful in the preparation of polyurethanes, from which reactant (b) of the compositions of the present invention can be selected, include, with some embodiments, aliphatic, aromatic, cycloaliphatic and heterocyclic polyisocyanates, and mixtures of such polyisocyanates. Further examples of polyisocyanates useful in the preparation of polyurethanes include, but are not limited to, toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis(isocyanato ethyl)fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate and mixtures thereof.

Examples to polyols having at least two hydroxyl groups, from which the polyurethanes, from which reactant (b) of the compositions of the present invention can be selected, can be prepared, include, but are not limited to those polyols recited previously herein. With some embodiments, the polyols, from which the polyurethanes can be prepared, can be selected from those recited further herein with regard to the polyols from which the polyol residues having at least two oxirane groups can be prepared. With some further embodiments, the polyols, from which the polyurethanes can be prepared, can be selected from those recited previously herein with regard to the polyesters.

The polyurethanes, from which reactant (b) of the compositions of the present invention can be selected, can have an Mn of less than 10,000, such as from 100 and 7,000, with some embodiments. The reactive group equivalent weight of the polyurethanes is, with some embodiments, less than or equal to 3,000 grams/equivalent, such as from 100 to 2,000 grams/equivalent.

In accordance with some embodiments, the reactive groups, of reactant (b) of the compositions of the present invention, are each independently selected from oxirane, thiooxirane, isocyanate, isothiocyanate, capped isocyanate, capped isothiocyanate, keto groups, and aldehyde. The reactive groups can, with some embodiments, be introduced into the reactant (b) during or after formation of the reactant (b) in accordance with art recognized methods. With some embodiments, the monomers and/or components from which reactant (b) is synthesized include one or more reactive groups or a precursor thereof. For purposes of non-limiting illustration, (meth)acrylate polymers, from which reactant (b) can be selected, can with some embodiments be synthesized from monomers that include oxirane functionality, such as glycidyl (meth)acrylate. With some further embodiments, and for purposes of further non-limiting illustration, oxirane functionality can be introduced into a hydroxyl functional precursor of a reactant (b) by reaction of the hydroxyl groups thereof with epichlorohydrin, in accordance with art-recognized methods.

With some embodiments, the reactive groups of reactant (b) are each independently selected from capped isocyanate and capped isothiocyanate. By "capped" (or "blocked") is meant that the isocyanate or isothiocyanate groups are capped/blocked with a group that uncaps (or de-blocks) at elevated temperatures, which results in the formation of uncapped (or free) isocyanate/isothiocyanate groups and free capping groups. The uncapped isocyanate/isothiocyanate groups are free to react with the hydrazide groups of the hydrazide functional material (a), and the free capping groups typically volatilize out of the cured article and/or reside in the cured article in a free form, such as in the form of a plasticizer with some embodiments.

Classes of capping or blocking agents for isocyanate/isothiocyanate groups include, but are not limited to, any suitable aliphatic, cycloaliphatic, or aromatic alkyl monoalcohol or phenolic compound known to skilled artisans. Examples of suitable blocking agents include, but are not limited to, those materials which unblock at elevated temperatures such as lower aliphatic alcohols including methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols in which the substituents do not affect coating operations, such as cresol and nitrophenol. Glycol ethers can also be used as capping agents, with some embodiments. Suitable glycol ethers include, but are not limited to, ethylene glycol butyl ether, diethylene glycol butyl ether, ethylene glycol methyl ether and propylene glycol methyl ether. Other suitable capping agents include oximes such as methyl ethyl ketoxime, acetone oxime and cyclohexanone oxime, lactams such as epsilon-caprolactam, pyrazoles such as dimethylpyrazole, and amines such as dibutyl amine.

Reactant (b), of the compositions of the present invention, is with some embodiments a polyol residue having at least two oxirane groups. As used herein, the term "polyol residue" and related terms, such as "polyol residues," "polyol," and "polyols," with regard to polyol residues having at least two oxirane groups from which reactant (b) can be selected, means residues of polyols that are structurally distinguishable from: the polyester residues of the polyesters having at least two reactive groups; the polyether residues of the polyethers having at least two reactive groups; the polyurethane residues of the polyurethanes having at least two reactive groups; and polymer residues of the (meth)acrylate polymers having at least two reactive groups. With some embodiments, the term "polyol residue" and related terms with regard to polyol residues having at least two oxirane groups, is a non-polymeric material that is free of repeating monomer units (or monomer residues).

With some embodiments, the polyol residue (from which the polyol residues having at least two oxirane groups are formed) is a residue of a polyol selected from aliphatic polyols and/or aromatic polyols. In accordance with some further embodiments, the polyol residue (from which the polyol residues having at least two oxirane groups are formed) is a residue of a polyol selected from glycerin, trimethylolpropane, trimethylolethane, trishydroxyethylisocyanurate, pentaerythritol, ethylene glycol, propylene glycol, trimethylene glycol, butanediol, heptanediol, hexanediol, octanediol, 4,4'-(propane-2,2-diyl)dicyclohexanol, 4,4'-methylenedicyclohexanol, neopentyl glycol, 2,2,3-trimethylpentane-1,3-diol, 1,4-dimethylolcyclohexane, 2,2,4-trimethylpentane diol, 4,4'-(propane-2,2-diyl)diphenol, and 4,4'-methylenediphenol.

The polyol residue, with some embodiments, (from which the polyol residues having at least two oxirane groups are formed) is a residue of a polyol selected from 4,4'-(propane-2,2-diyl)diphenol, 4,4'-(propane-2,2-diyl)dicyclohexanol, 4,4'-methylenediphenol, 4,4'-methylenedicyclohexanol, and combinations thereof.

The polyol residue having at least two oxirane groups can be formed in accordance with art-recognized methods. With some embodiments, the polyol residue having at least two oxirane groups is formed from the reaction of one mole of a polyol having at least two hydroxyl groups with at least two moles of epichlorohydrin under art-recognized reaction and work-up conditions.

The oxirane (or epoxy) equivalent weight of the polyol residues having at least two oxirane groups is, with some embodiments, less than or equal to 1000 grams/equivalent, such as from 100 to 1000 grams/equivalent.

The curable compositions of the present invention are, with some embodiments, formulated so as to have a ratio of hydrazide groups of the hydrazide functional material (a) to reactive groups of the reactant (b) that results in a cured article, such as, but not limited to, a cured three-dimensional article (such as a cured three-dimensional molded article), a cured film, a cured sheet, or a cured coating layer, that has desirable physical properties. Examples of desired physical properties include, but are not limited to, hardness, impact resistance, abrasion resistance, scratch resistance, solvent resistance, tensile strength, and/or shear strength (such as lap shear strength). With some embodiments, the curable compositions of the present invention have a ratio of (i) hydrazide groups of the hydrazide functional material (a) to (ii) reactive groups of the reactant (b) that is: from 1:0.5 to 1:4; or from 1:0.7 to 1:3; or from 1:0.8 to 1:2.5; or from 1:0.9 to 1:2.

The hydrazide functional material (a) is, with some embodiments, present in the curable composition an amount of 5 to 40 percent by weight, or from 10 to 30 percent by weight, or from 15 to 25 percent by weight, in each case based on total weight of the hydrazide functional material (a) and the reactant (b). The reactant (b) is, with some embodiments, present in the curable composition an amount of 60 to 95 percent by weight, or from 70 to 90 percent by weight, or from 75 to 85 percent by weight, in each case based on total weight of said hydrazide functional material (a) and the reactant (b).

The curable compositions of the present invention, with some embodiments, further optionally include one or more additional (or adjunct) hydrazide functional materials that are different than the hydrazide functional materials represented by Formula (I). The adjunct hydrazide functional materials include, with some embodiments, at least two hydrazide groups, such as two to six hydrazide groups. The adjunct hydrazide functional materials can, with some embodiments, be formed in accordance with art-recognized methods from carboxylic acid functional materials having two or more carboxylic acid groups. Examples of adjunct hydrazide functional materials include, but are not limited to: malonic dihydrazide; succinic dihydrazide; 2-ethyl-3-propylsuccinic dihydrazide; glutaric dihydrazide; adipic dihydrazide; pimelic dihydrazide; suberic dihydrazide; azelaic dihydrazide; sebacic dihydrazide; undecanedioic dihydrazide; dodecanedioic dihydrazide; tridecanedioic dihydrazide; tetradecanedioic dihydrazide; pentadecanedioic dihydrazide; hexadecanedioic dihydrazide; 2-methyltetradecanedioic dihydrazide; dicyanofumaric dihydrazide; pentane-1,3,5-tricarboxylic trihydrazide; and hex-4-ene-1,2,6-tricarboxylic trihydrazide.

With some embodiments, the adjunct hydrazide functional material(s) are present in the curable composition in an amount of from 0.5 to 50 percent by weight, or from 1 to 25 percent by weight, or from 1 to 15 percent by weight, or from 1 to 10 percent by weight, or from 1 to 5 percent by weight, in each case based on total weight of hydrazide funcational material (a) and adjunct hydrazide functional material.

When the optional adjunct hydrazide functional material is present in the curable compositions of the present invention, the ratio of hydrazide groups to reactive groups of reactant (b) includes the sum (or combination) of the hydrazide groups of the hydrazide functional material (a) and the adjunct hydrazide functional material, and correspondingly, with some embodiments, includes those ratios and ranges as recited previously herein, such as: from 1:0.5 to 1:4; or from 1:0.7 to 1:3; or from 1:0.8 to 1:2.5; or from 1:0.9 to 1:2.

The curable compositions of the present invention can also, with some embodiments, include pigments and/or fillers. Examples of pigments include, but are not limited to: inorganic pigments, such as titanium dioxide and iron oxides; organic pigments, such as phthalocyanines, anthraquinones, quinacridones and thioindigos; and carbon blacks. Examples of fillers include, but are not limited to: silica, such as precipitated silicas; clay; mica; dolomite; talc; zinc borate; magnesium carbonate; calcium oxide; calcium carbonate; calcium silicate; calcium metasilicate; and/or barium sulfate. With some embodiments, the filler is or includes a fibrous filler, such as milled glass fibers and/or milled carbon fibers. When used in the composition of the present invention, pigments and fillers can, with some embodiments, be present in amounts of from 0.1 percent to 70 percent by weight, based on the total weight of the curable composition.

The curable compositions of the present invention can, with some embodiments, include additives such as, but not limited to: waxes for flow and wetting; flow control agents, such as poly(2-ethylhexyl)acrylate; degassing additives such as benzoin (particularly, in the case of curable powder coating compositions); thixotropes (particularly, in the case of curable adhesive compositions); plastisizers; diluents; adjuvant resin to modify and optimize coating properties; antioxidants; and ultraviolet (UV) light absorbers. Examples of useful antioxidants and UV light absorbers include, but are not limited to, those available commercially from BASF under the trademarks IRGANOX and TINUVIN. Examples of thixotropes include, but are not limited to, fumed silica, bentonite, stearic acid-coated calcium carbonate, polyamide, and fatty acid/oil derivatives. These optional additives, when used, can be present in amounts up to 20 percent by weight, based on total weight of the curable composition.

The curable compositions of the present invention can, with some embodiments, include one or more art-recognized catalysts and/or accelerators, that are suitable for catalyzing and/or accelerating the formation of covalent bonds between the hydrazide groups of the hydrazide functional material (a) and the reactive groups of the reactant (b).

For purposes of non-limiting illustration, when the reactive groups of the reactant (b) are oxirane and/or thiooxirane groups, an accelerator can be present, which is selected from urea functional compounds and/or imidazole functional compounds. Examples of urea functional compounds from which the accelerator can be selected include, but are not limited to, phenyl dimethyl urea, toluene dimethyl urea, cycloaliphatic bisurea, N-(3,4-dichlorophenyl)-N,N-dimethyl urea, and 4,4'-methylene bis(phenyl dimethylurea). A non-limiting example of an imidazole functional compound from which the accelerator can be selected is, 6-(2-(2-methyl-1H-imidazol-1-yl)ethyl)-1,3,5-triazine-2,4-diamine. Accelerators are, with some embodiments, present in the curable compositions of the present invention in amounts of from 0.5 to 30 percent by weight, or from 0.5 to 10 percent by weight, or from 0.5 to 5 percent by weight, based in each case on the total weight of the curable composition.

For purposes of further non-limiting illustration, when the reactive groups of the reactant (b) are oxirane and/or thiooxirane groups, a catalyst can be present, which is selected from one or more guanidines, with some embodiments. Examples of guanidines include, but are not limited to, methylguanidine, dimethylguanidine, trimethylguanidine, tetra-methylguanidine, methylisobiguanidine, dimethylisobiguanidine, tetramethylisobiguanidine, hexamethylisobiguanidine, heptamethylisobiguanidine, and cyanoguanidine (which is also referred to as dicyandiamide).

When the reactive groups of reactant (b) are selected from isocyanate, isothiocyanate, capped isocyanate, and/or capped isothiocyanate groups, the curable compositions of the present invention can, with some embodiments, further include one or more catalysts for catalyzing the formation of covalent bonds between the hydrazide groups of the hyradazide functional material (a) and such reactive groups of reactant (b). With some embodiments, examples of such catalysts include, but are not limited to, art-recognized materials, such as one or more stannous salts of an organic acid, examples of which include, but are not limited to, stannous octoate, dibutyl tin dilaurate, dibutyl tin diacetate, dibutyl tin mercaptide, dibutyl tin dimaleate, dimethyl tin diacetate, dimethyl tin dilaurate and 1,4-diazabicyclo[2.2.2]octane. Additional classes of such catalysts include, but are not limited to, bismuth salts of organic acids, such as bismuth 2-ethylhexanoate, and zinc-based catalysts.

Catalysts are, with some embodiments, present in the curable compositions of the present invention in amounts of less than 5 percent by weight, such as from 0.1 to 2 percent by weight, based on the total weight of the curable composition.

With some embodiments, the curable compositions of the present invention are free of accelerator and are free of catalyst.

The curable compositions of the present invention are cured, with some embodiments, by exposure to elevated temperatures, such as temperatures above 25° C. With some embodiments, the curable compositions of the present invention are cured by exposure to elevated temperatures of from 100° C. to 204° C., or from 110° C. to 177° C., or from 120° C. to 163° C., or from 125° C. to 149° C., for an appropriate amount of time, such as from 15 minutes to 8 hours, or from 20 minutes to 2 hours, or from 30 minutes to 1 hour. The elevated temperatures can be provided, with some embodiments, by a convective heat source and/or a radiant heat source (such as an electromagnetic heat source, such as an infrared heat source).

The curable compositions of the present invention can, with some embodiments, include one or more solvents. The solvents can be selected from water and/or one or more organic solvents. Examples of organic solvents include, but are not limited to: monoalcohols, such as methanol, ethanol, isopropanol, butanol; polyols, such as butyl cellosolve, hexyl cellosolve, ethylene glycol, propylene glycol, and one or more poly(alkylene glycols); aliphatic hydrocarbon solvents, such as, hexane, heptane, octane, and mineral spirits; and aromatic solvents, such as, xylene and toluene. With some embodiments, solvents are present in the curable coating compositions of the present Invention in an amount of from 5 to 90 percent by weight, such as from 10 to 60 percent by weight, or from 20 to 50 percent by weight, the percent weights in each case being based on the total weight of the curable composition (including the solvent).

Examples of articles that can be prepared with (or from, or using) the curable compositions of the present invention include, but are not limited to: coatings; films; sheets; molded articles, such as three-dimensional molded articles, such as lenses, optical lenses, and/or ophthalmic lenses; and adhesives. As used herein, the term "film" means a single layer or multilayer structure that is not self-supporting. As used herein, the term "sheet" means a single layer or multilayer structure that is self-supporting. Correspondingly, a film prepared from the curable compositions of the present invention is, with some embodiments, more flexible than a sheet prepared from the curable compositions of the present Invention. Further correspondingly, a sheet prepared from the curable compositions of the present invention is, with some embodiments, less flexible (or stiffer, or more stiff) than a film prepared from the curable compositions of the present invention. Coatings prepared from the curable compositions of the present invention, with some embodiments: reside over and are supported by an underlying substrate; and are formed by applying and curing the curable compositions of the present invention over a substrate.

With some embodiments, the curable compositions of the present invention are substantially free of solvents. With some embodiments, the curable compositions of the present invention include less than 5 percent by weight, or less than 2 percent by weight, or less than 1 percent by weight or less than 0.5 percent by weight of solvent, based in each case on total weight of the curable composition. With some embodiments, the curable compositions of the present invention are free of solvents.

In accordance with some embodiments, the curable composition of the present invention is a curable solid particulate composition that is free flowing. In accordance with some further embodiments, the curable solid particulate composition is a curable powder coating composition. The curable solid particulate compositions of the present invention are, with some embodiments, substantially free of solvent.

The curable solid particulate compositions of the present invention can, with some embodiments, be prepared by first dry blending the hydrazide functional reactant (a), the reactant (b), and optionally additives, such as flow control agents, degassing agents, antioxidants and UV absorbing agents, in a dry blender, such as a HENSCHEL blade dry blender. The dry blender is operated for a period of time that is at least sufficient to result in a homogenous dry blend of the materials charged thereto. The homogenous dry blend is then melt blended in a melt blender, such as an extruder, such as a twin screw co-rotating extruder, operated within a temperature range of 80° C. to 140° C., or from 100° C. to 125° C. The extrudate of the curable solid particulate composition of the present invention is cooled and, when used as a powder coating composition, is typically milled to an average particle size of from 15 to 40 microns, or from 20 to 30 microns, with some embodiments.

The hydrazide functional reactant (a) and reactant (b) of the curable solid particulate composition of the present invention are each independently, with some embodiments: resinous and have a glass transition temperature (Tg); or crystalline and have a crystalline melting point. By "resinous" is meant that the reactant is composed of a majority of amorphous domains, and can optionally have some crystalline domains. By "crystalline" is meant that the reactant has a majority of crystalline domains, and optionally some, such as a minority, of amorphous domains. With some embodiments, a crystalline reactant of the curable solid particulate composition includes some amorphous domains.

The curable solid particulate compositions of the present invention, with some embodiments, melt and flow when exposed to elevated temperature, such as under conditions of cure. In accordance with some further embodiments, when exposed to elevated temperature, such as under conditions of cure, the curable solid particulate compositions of the present invention melt and flow, substantially uniformly, so as to form coatings having substantially uniform thicknesses and optionally smooth surfaces.

In accordance with some further embodiments, the curable solid particulate composition of the present invention is a powder coating composition. With some further embodiments, the curable solid particulate composition of the present invention is a thermosetting powder coating composition. The curable solid particulate compositions of the present invention can, with some embodiments, be cured at elevated temperatures, including, but not limited to, those elevated temperatures and ranges described previously herein with regard to the curable compositions of the present invention.

The curable composition of the present invention can, with some embodiments be used to coat a substrate, such as when it is in the form of a curable coating composition, such as a curable powder coating composition. The present invention also relates to a method of coating a substrate that involves: (a) applying to the substrate a thermosetting composition; (b) coalescing the thermosetting composition to form a substantially continuous film; and (c) curing the thermosetting composition by exposure to elevated temperature. The thermosetting composition includes or is defined by the curable composition of the present invention, which can, with some embodiments, be a curable solid particulate composition as previously described herein.

The curable compositions of the present invention can be applied, with some embodiments, to a substrate by any appropriate art-recognized method. When the curable compositions of the present invention are in liquid form, they can be applied by methods including, but not limited to: spray application; curtain coating; spin coating; and/or doctor blade application. With some embodiments, curable composition is a curable solid particulate composition, which is in the form of a dry powder, such as a powder coating, and is applied by spray application. Alternatively, the dry powder can be slurried in a liquid medium such as water, and spray applied. As used herein, the term "curable solid particulate composition" means a curable solid particulate composition that can be in dry powder form or in the form of a slurry that includes one or more liquids, such as water and optionally one or more organic solvents, such as alcohols.

The curable composition of the present invention can be applied as a single layer or multiple layered coating, in which each layer has the same or different compositions. The curable composition of the present invention can be applied in conjunction with one or more other coating compositions, such as but not limited to, primers, base coats, and/or clear coatings. The curable compositions of the present invention can be used to form (or as) primers, base coats, and/or clear coatings. As used herein, the term "clear coatings" includes, with some embodiments, transparent top coats. Coating layers formed from the curable compositions of the present invention can, with some embodiments, have a thickness of from 0.5 to 20 mils (13 to 508 microns), or from 0.5 to 10 mils (13 to 254 microns), or of from 0.5 to 6 mils (13 to 152 microns), or from 1 to 3 mils (25 to 76 microns).

Substrates to which curable compositions of the present invention can be applied include, with some embodiments: plastic substrates, such as rigid plastic substrates, such as engineering plastics; ceramic substrates, such as glass substrates; wood or wood-based substrates; rigid metal substrates, such as titanium, ferrous metals, aluminum, aluminum alloys, copper, and other metal and alloy substrates. Non-limiting examples of steel substrates include cold rolled steel, galvanized (zinc coated) steel, electrogalvanized steel, stainless steel, pickled steel, zinc-iron alloy such as GALVANNEAL, and combinations thereof. Combinations or composites of metal and non-metal substrates can be used, with some embodiments. Combinations or composites of ferrous and non-ferrous metals can also be used as substrates, with some further embodiments. When used as an adhesive composition, the curable compositions of the present invention can be interposed between two substrates, which can be the same or different.

The thickness of the substrates to which the curable compositions of the present invention can be applied, with some embodiments, ranges from 0.127 to 3.175 millimeters (mm) (5 to 125 mils), or from 0.6 to 1.2 mm (23.6 to 47.2 mils), although the thickness can be greater or less, as desired. The width of a coil strip, with some embodiments, generally from 30.5 to 183 centimeters (12 to 72 inches), although the width of the substrate can vary depending upon its shape and intended use.

Prior to depositing any treatment, and/or applying any coating compositions, such as according to the present invention, and/or applying any adhesive compositions, such as according to the present invention, on the surface of the substrates, with some embodiments, foreign matter is removed from the substrate surface by thoroughly cleaning and optionally degreasing the surface. Such cleaning takes place, with some embodiments, after forming the substrate (such as by stamping, molding, welding, etc.) into an end-use shape. The surface of the substrate can be cleaned by physical or chemical methods, such as mechanically abrading the surface and/or cleaning/degreasing with art-recognized and/or commercially available alkaline or acidic cleaning agents, such as sodium metasilicate and sodium hydroxide. A non-limiting example of a cleaning agent is CHEMKLEEN 163, which is an alkaline-based cleaner commercially available from PPG Industries, Inc.

Following the cleaning step, the substrate can, with some embodiments, be rinsed with deionized water or an aqueous solution of rinsing agents in order to remove residue(s) of the cleaning agent(s). The substrate can, with some embodiments, be air dried, such as, by using an air knife, by flashing off the water by brief exposure of the substrate to elevated temperature(s), and/or by passing the substrate between squeegee rolls. After the rinsing and drying steps, the surface of the substrate can be subjected to one or more art-recognized pre-treatment steps, such as one or more phosphate conversion treatments in the case of ferrous substrates. One or more coatings, such as one or more primers, can be applied to the substrate, prior to application of the curable compositions of the present invention, with some embodiments. With some further embodiments, the curable compositions of the present invention are applied to the substrate in the absence of one or more further coating layers interposed between the substrate surface and the applied curable coating composition of the present invention.

With some embodiments, the curable composition of the present invention is a curable adhesive composition. The curable adhesive compositions of the present invention are, with some embodiments, in the form of a liquid. By "liquid" is meant that the curable adhesive compositions have a viscosity that allows them to be at least extrudable. The curable adhesive compositions of the present invention are, with some embodiments, both (i) substantially free of solvents, or free of solvents, and (ii) liquid. With some further embodiments, the curable adhesive compositions include one or more solvents, as discussed previously herein with regard to the curable compositions of the present invention.

The curable adhesive compositions of the present invention can have a viscosity that allows them to be at least pumpable, with some embodiments. With some further embodiments, the curable adhesive compositions of the present invention have a viscosity that allows them to be sprayable. With some embodiments, the curable adhesive compositions of the present invention have an elevated temperature when applied, such as, a temperature of 40° C. to 60° C., to facilitate pumping, spraying, or extruding the curable adhesive composition through a nozzle. The curable adhesive compositions of the present invention can, with some embodiments, be applied by methods including, but not limited to, spray application, extrusion, brushing, doctor blade application, or any combination thereof.

The curable adhesive compositions of the present invention can, with some embodiments, be applied directly to the substrate surface, such as a bare substrate surface, a pre-treated substrate surface, or a substrate surface having one or more previously applied coating layers thereon.

The adhesive compositions of the present invention can be applied at any suitable thickness. With some embodiments, the adhesive compositions are applied over a substrate at a thickness of from 62.5 µm to 1000 µm, or from 62.5 µm to 500 µm, or from 125 µm to 375 µm. The adhesive compositions of the present invention are, with some embodiments, applied so as to be interposed between two separate substrates and/or opposing surfaces of the same substrate (such as in the case of a substrate that has been at least partially folded back on itself), and have a thickness of 62.5 μm to 1000 μm, or from 62.5 μm to 500 μm, or from 125 μm to 375 μm, with some embodiments. The adhesive compositions of the present invention can, with some embodiments, be cured at elevated temperatures, including, but not limited to, those elevated temperatures and ranges described previously herein with regard to the curable compositions of the present invention.

The present invention is more particularly described in the following examples, which are intended to be illustrative only, since numerous modifications and variations therein will be apparent to those skilled in the art. Unless otherwise specified, all parts and percentages are by weight.

EXAMPLES

The following Examples A-C provide descriptions of the synthesis of hydrazide functional materials that were used in the adhesive compositions of Examples 1-3, as described in further detail herein.

Synthesis Examples A-C

Example A

Present Example A provides a description of the synthesis of a comparative hydrazide functional material having two hydrazide groups and no sulfide linkages, which is represented by the following Formula (IX).

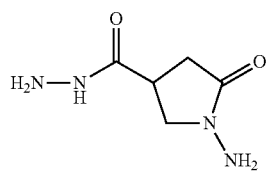

(IX)

Into a 500-milliliter, 4-necked flask equipped with a stirrer, a condenser, a nitrogen inlet, and a thermocouple in a heating mantle, was charge 71 grams of dimethyl itaconate. Agitation and a nitrogen flow of 1.0 SCFH ("SCFH" means standard cubic feet per hour) were started. Next, 44.3 grams of hydrazine in water (65% by weight) and 71 g of DOWANOL PM glycol ether (the major isomer of which is 1-methoxy-2-propanol) were added to the flask. Then the reaction mixture was heated to and maintained at reflux for 12 hours. After completion of the reaction, the contents of the flask were cooled to ambient temperature (of about 25° C.). A solid material formed, which was collected by filtration. The collected solid material was dried in a 110° C. oven for 6 hours. A white powder was obtained in a yield of 81% by weight.

Example B

Present Example B provides a description of the synthesis of a hydrazide functional material according to the present invention that has three hydrazide groups, which is represented by Formula (I-1) (as depicted previously herein).

Into a 500-milliliter, 4-necked flask equipped with a stirrer, a condenser, a nitrogen inlet, and a thermocouple in a heating mantle, was charged 100 grams of dimethyl itaconate and 75.98 grams of methyl 3-mercaptopropionate. Agitation and a nitrogen flow of 1.0 SCFH were started. Next, 0.08 grams of catalyst (CYTOP 380 ORGANOPHOSPHINE) was added into reaction mixture. Heat was promptly generated and the temperature of the reaction mixture increased from 23° C. to 95° C. The reaction mixture was held at 80° C. for 2 hours until the reactants were consumed, as determined by gas chromatograph (GC) analysis. The reaction mixture was then cooled to 60° C., and 93.53 grams of hydrazine in water (65% by weight) and 200 grams of DOWANOL PM glycol ether were charged into flask. The reaction mixture was heated to and maintained at reflux for 12 hours. After completion of the reaction, the contents of the flask were cooled to ambient temperature (of about 25° C.). A solid material formed and was collected by filtration. The solid material was dried in a 110° C. oven for 6 hours. A white powder was obtained in a yield of 55% by weight.

Example C

Present Example C provides a description of the synthesis of a hydrazide functional material according to the present invention that has four hydrazide groups, which is represented by Formula (I-3) (as depicted previously herein).

Into a 500-milliliter, 4-necked flask equipped with a stirrer, a condenser, a nitrogen inlet, and a thermocouple in a heating mantle, was charged 100 grams of dimethyl itaconate and 48.78 grams of 2,2'-thiodiethanethiol. Agitation and a nitrogen flow of 1.0 SCFH were started. Next, 0.08 grams of catalyst (CYTOP 380 ORGANOPHOSPHINE) was added into reaction mixture followed by 50 grams of DOWANOL PM glycol ether. Heat was promptly generated and the temperature of the reaction mixture increased from 23° C. to 69° C. The reaction mixture was held at 60° C. for 2 hours until the reactants were consumed, as determined by GC analysis. Then the reaction mixture was cooled to 40° C. and 62.36 grams of hydrazine in water (65% by weight), 160 g of DOWANOL PM glycol ether, and 50 grams of deionized water were added into flask. The reaction mixture was heated to and maintained at reflux for 12 hours. After completion of the reaction, the contents of the flask were cooled to ambient temperature (of about 25° C.). A solid material formed and was collected by filtration. The collected solid material was dried in a 110° C. oven for 6 hours. A white powder was obtained in a yield of 54% by weight.

Adhesive Composition Examples 1-3

The hydrazide functional materials of Examples A-C were used to prepare the adhesive compositions of Examples 1-3, which are summarized in the following Table 1. The ingredients as summarized in the following Table 1 were mixed together in a plastic container using a SpeedMixer laboratory mixer system commercially available from FlackTeck Inc. The adhesive compositions were used to prepare lap shear test specimens as described in further detail below.

TABLE 1

| Components | Example 1 (parts by weight) | Example 2 (parts by weight) | Example 3 (parts by weight) |
|---|---|---|---|
| Epoxy resin[1] | 48 | 48 | 48 |
| Epoxy Resin[2] | 13.4 | 13.4 | 13.4 |
| Epoxy Resin[3] | 1.5 | 1.5 | 1.5 |
| Epoxy Resin[4] | 3.5 | 3.5 | 3.5 |
| Carbon Black[5] | 0.2 | 0.2 | 0.2 |
| Example C | 19.5 | — | — |
| Example B | — | 13.9 | — |

TABLE 1-continued

| Components | Example 1 (parts by weight) | Example 2 (parts by weight) | Example 3 (parts by weight) |
|---|---|---|---|
| Example A | — | — | 9.7 |
| Mica[6] | 1.5 | 1.5 | 1.5 |
| Calcium Oxide[7] | 2 | 2 | 2 |
| Totals | 86.1 | 84.0 | 79.8 |

1. A blend of bisphenol A based epoxy resin and a core-shell rubber obtained commercially from Kaneka Corporation under the trade designation, KANE ACE MX-153 epoxy resin.
2. An oxirane functional polyester having: a Mw of 3449; containing residues of the following monomers in approximate percent by weight values, based on total weight of monomer residues, 62.2 wt % of bisphenol A-epichlorohydrin, 25.6 wt % of poly(tetramethylene ethylene ether)glycol, and 12.2 wt % of hexahydrophthalic anhydride; and an epoxy value of 412.
3. An adduct of bisphenol A based epoxy and Pripol 1022 dimer fatty acid, which Is commercially available from Croda Inc. Pripol 1022 dimer fatty acid is described by Croda Inc. as a $C_{36}$ dimer fatty acid that is composed of 80 wt % of dimmer acid, and 20 wt % of trimer acid.
4. An adduct of bisphenol A based epoxy and carboxylic acid-terminated butane/acrylonitrile rubber, which was obtained commercially from Momentive under the tradename of EPON Resin 58006 epoxy resin, which is described by Momentive as having an epoxy equivalent weight of 330 to 360 g/eq (as determined in accordance with ASTM D1652), and an elastomer content of approximately 40% by weight.
5. Obtained commercially from Columbian Chemicals under the trade designation of RAVEN 410 carbon black.
6. Obtained commercially from Pacer Corporation.
7. Obtained commercially from Mississippi Lime Company.

The adhesive compositions of Examples 1-3 were used to prepare lap shear test specimens in accordance with the following procedure. Adhesive lap shear test specimens were prepared by applying adhesive on 20 mm×90 mm hot dip galvanized (HDG) steel panels. The adhesive was applied to one end of a panel covering the whole width and 10 mm from the end thereof. Glass beads having an average diameter of 0.25 mm were lightly sprinkled onto the adhesive for purposes of maintaining separation with regard to the second opposing HDG steel panel. Another HDG steel panel (the second opposing HDG steel panel), without adhesive, was then placed over the adhesive area in an end-to-end fashion, which resulted in a 10 mm×20 mm bond area between the two HDG steel panels, so as to form intermediate bonded panels. The intermediate bonded panels were secured with metal clamps, and excess adhesive was removed. The metal clamped intermediate bonded panels were then placed in an oven and the interposed adhesives cured by exposure to elevated temperatures as summarized in the following Table 2, which resulted in the formation of lap shear test specimens. After removal from the oven and cooling to room temperature, the lap shear test specimens were tested using an INSTRON 5567 machine, in tensile mode, with a pull rate of 10 mm per minute. The adhesive lap shear strength values were recorded and are listed in the following Table 2 with units of megapascals (MPa).

TABLE 2

| Cure Conditions | Example 1 (MPa) | Example 2 (MPa) | Example 3 (MPa) |
|---|---|---|---|
| 130° C./30 minutes | 0.5 | 1.0 | 0.6 |
| 140° C./30 minutes | 1.4 | 16.4 | 1.6 |
| 150° C./30 minutes | 9.8 | 18.5 | 2.2 |
| 160° C./30 minutes | 17.7 | 17.7 | 3.2 |

For many applications, adhesive lap shear strength values of at least 9.5 MPa are generally required. It is typically desirable that an adhesive provide at least a minimum threshold adhesive lap shear strength value under cure conditions that require a minimum of energy, such as reduced temperature and time. The results summarized in Table 2 demonstrate that adhesive compositions according to the present invention, such as represented by Examples 1 and 2, provide a desirable level of adhesive lap shear strength values under reduced cure temperatures, such as 140° C./30 minutes with Example 2, and 150° C./30 minutes with Example 1, relative to comparative adhesive compositions, such as represented by Example 3.

The present invention has been described with reference to specific details of particular embodiments thereof. It is not intended that such details be regarded as limitations upon the scope of the Invention except insofar as and to the extent that they are included in the accompanying claims.

What is claimed is:

1. A curable composition comprising:
   (a) a hydrazide functional material represented by the following Formula (I),

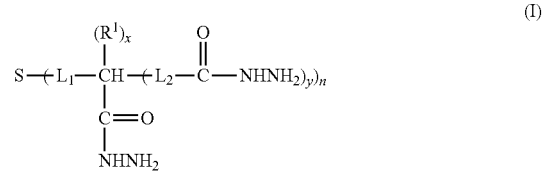

wherein for Formula (I), n is 2, independently for each n unit, x is 0 or 1, y is 0 or 1, provided that the sum of x and y is 1, $L_1$, independently for each n unit, is selected from a divalent hydrocarbyl group optionally interrupted with at least one of —O— and —S—, $L_2$, independently for each n unit, is selected from a divalent hydrocarbyl group, $R^1$, independently for each n unit, is selected from hydrogen and hydrocarbyl; and (b) a reactant comprising at least two reactive groups that are reactive with and form covalent bonds with the hydrazide groups of said hydrazide functional material, wherein said curable composition is a curable solid particulate composition that is free flowing.

2. The curable composition of claim 1 wherein, for said hydrazide functional material represented by Formula (I), $L_1$, independently for each n unit, is a divalent group selected from divalent aryl, divalent $C_3$-$C_8$ cycloalkyl, and divalent linear or branched $C_1$-$C_{20}$ alkyl, wherein each divalent group is optionally interrupted with at least one of —O— and —S—, $L_2$, independently for each n unit, is selected from divalent aryl, divalent $C_3$-$C_8$ cycloalkyl, and divalent linear or branched $C_1$-$C_{20}$ alkyl, and R¹, independently for each n unit, is selected from hydrogen, aryl, $C_3$-$C_8$ cycloalkyl, and linear or branched $C_1$-$C_{20}$ alkyl.

3. The curable composition of claim 2 wherein, for said hydrazide functional material represented by Formula (I),
$L_1$, independently for each n unit, is selected from divalent linear or branched $C_1$-$C_6$ alkyl,
$L_2$, independently for each n unit, is selected from divalent linear or branched $C_1$-$C_6$ alkyl, and
R¹, independently for each n unit, is selected from hydrogen and linear or branched $C_1$-$C_6$ alkyl.

4. The curable composition of claim 1 wherein, said hydrazide functional material represented by Formula (I), is selected from at least one hydrazide functional material represented by the following Formula (I-A) and Formula (I-B),

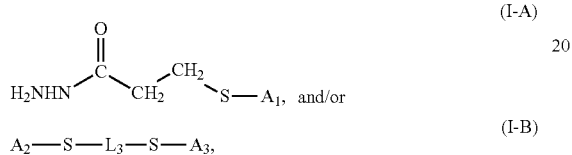

(I-A)

$A_2$—S—$L_3$—S—$A_3$, (I-B)

wherein for Formula (I-B), $L_3$ is selected from divalent hydrocarbyl optionally interrupted with at least one of —S— and —O—,
wherein for Formula (I-A) and Formula (I-B), $A_1$, $A_2$, and $A_3$ are in each case independently selected from a group represented by the following Formula (IV) and Formula (V),

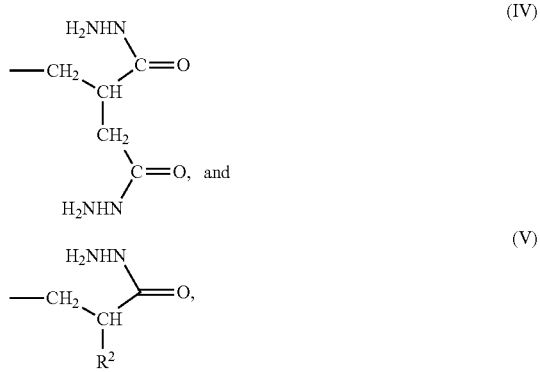

wherein for Formula (V), $R^2$ is selected from hydrogen and methyl.

5. The curable composition of claim 4 wherein for Formula (I-B), $L_3$ is selected from divalent linear or branched $C_1$-$C_6$ alkyl optionally interrupted with at least one of —S— and —O—.

6. The curable composition of claim 5 wherein for Formula (I-B), $L_3$ is selected from —$CH_2$—, —$CH_2CH_2$—, and —$CH_2CH_2$—S—$CH_2CH_2$—.

7. The curable composition of claim 1 wherein each reactive group of said reactant (b) is independently selected from oxirane, thiooxirane, isocyanate, isothiocyanate, capped isocyanate, capped isothiocyanate, keto groups, and aldehyde.

8. The curable composition of claim 7 wherein said reactant (b) is a polyol residue having at least two oxirane groups.

9. The curable composition of claim 8 wherein said polyol residue is a residue of a polyol selected from glycerin, trimethylolpropane, trimethylolethane, trishydroxyethylisocyanurate, pentaerythritol, ethylene glycol, propylene glycol, trimethylene glycol, butanediol, heptanediol, hexanediol, octanediol, 4,4'-(propane-2,2-diyl)dicyclohexariol, 4,4'-methylenedicyclohexanol, neopentyl glycol, 2,2,3-trimethylpentane-1,3-diol, 1,4-dimethylolcyclohexane, 2,2,4-trimethylpentane diol, 4,4'-(propane-2,2-diyl)diphenol, 4,4'-methylenediphenol, and combinations thereof.

10. The curable composition of claim 9 wherein said polyol is selected from 4,4'-(propane-2,2-diyl)diphenol, 4,4'-(propane-2,2-diyl)dicyclohexanol, 4,4'-methylenediphenol, 4,4'-methylenedicyclohexanol, and combinations thereof.

11. The curable composition of claim 1 wherein said reactant (b) is a polymer selected from (meth)acrylate polymers, polyethers, polyesters, polyurethanes, and combinations thereof,
wherein each polymer independently has at least two reactive groups that are reactive with and form covalent bonds with the hydrazide groups of said hydrazide functional material, and
wherein each reactive group is independently selected from oxirane, thiooxirane, isocyanate, isothiocyanate, capped isocyanate, capped isothiocyanate, keto groups, and aldehyde.

12. The curable composition of claim 1 wherein a ratio of hydrazide groups of said hydrazide functional material (a) to reactive groups of said reactant (b) is from
1:0.5 to 1:4.

13. The curable composition of claim 1 wherein, said hydrazide functional material (a) is present in an amount of 5 to 40 percent by weight, based on total weight of said hydrazide functional material (a) and said reactant (b), and
said reactant (b) is present in an amount of 60 to 95 percent by weight, based on total weight of said hydrazide functional material (a) and said reactant (b).

14. The curable composition of claim 1 wherein said curable solid particulate composition is a curable powder coating composition.

15. The curable composition of claim 1 wherein said curable composition is a curable adhesive composition.

16. A hydrazide functional material represented by the following Formula (I),

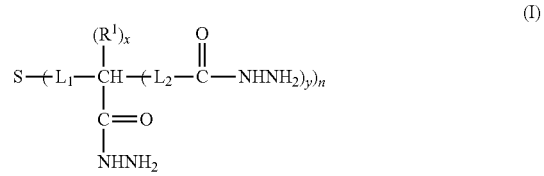

wherein for Formula (I),
n is 2,
x is 0 and y is 1 for a first n unit,
x is 0 or 1, and y is 0 or 1 for a second n unit, provided that the sum of x and y is 1,
$L_1$, independently for each n unit, is selected from a divalent hydrocarbyl group optionally interrupted with at least one of —O— and —S—,
$L_2$, independently for each n unit, is selected from a divalent hydrocarbyl group, and
R¹, independently for each n unit, is selected from hydrogen and hydrocarbyl.

17. The hydrazide functional material of claim 16 wherein,
$L_1$, independently for each n unit, is a divalent group selected from divalent aryl, divalent $C_3$-$C_{12}$ cycloalkyl, and divalent linear or branched $C_1$-$C_{25}$ alkyl, wherein each divalent group is optionally interrupted with at least one of —O— and —S—,
$L_2$, independently for each n unit, is selected from divalent aryl, divalent $C_3$-$C_{12}$ cycloalkyl, and divalent linear or branched $C_1$-$C_{25}$ alkyl, and
$R^1$, independently for each n unit, is selected from hydrogen, aryl, $C_3$-$C_8$ cycloalkyl, and linear or branched $C_1$-$C_{25}$ alkyl.

18. The hydrazide functional material of claim 17 wherein,
$L_1$, independently for each n unit, is selected from divalent linear or branched $C_1$-$C_6$ alkyl,
$L_2$, independently for each n unit, is selected from divalent linear or branched $C_1$-$C_6$ alkyl, and
$R^1$, independently for each n unit, is selected from hydrogen and linear or branched $C_1$-$C_6$ alkyl.

19. The hydrazide functional material of claim 16 wherein, said hydrazide functional material represented by Formula (I), is selected from at least one hydrazide functional material represented by the following Formula (I-A) and Formula (I-B),

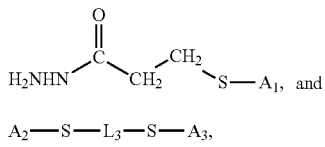

(I-A)

$A_2$—S—$L_3$—S—$A_3$, (I-B)

wherein for Formula (I-B), $L_3$ is selected from divalent hydrocarbyl optionally interrupted with at least one of —S— and —O—, wherein for Formula (I-A) and Formula (I-B), $A_1$ and $A_2$ are represented by the following Formula (IV) and $A_3$ is selected from a group represented by the following Formula (IV) and Formula (V),

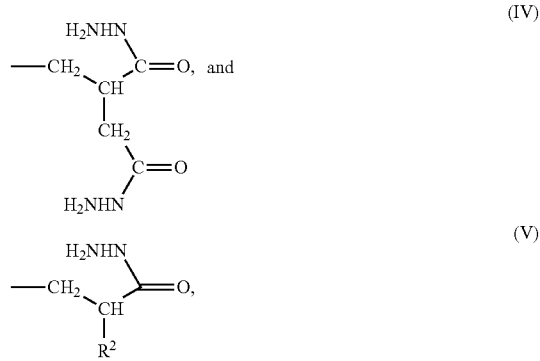

wherein for Formula (V), $R^2$ is selected from hydrogen and methyl.

20. The hydrazide functional material of claim 19, wherein for Formula (I-B), $L_3$ is selected from divalent linear or branched $C_1$-$C_6$ alkyl optionally interrupted with at least one of —S— and —O—.

21. The hydrazide functional material of claim 20, wherein for Formula (I-B), $L_3$ is selected from —$CH_2$—, —$CH_2CH_2$—, and —$CH_2CH_2$—S—$CH_2CH_2$—.

* * * * *